US008875166B2

(12) United States Patent
Plewnia

(10) Patent No.: US 8,875,166 B2
(45) Date of Patent: Oct. 28, 2014

(54) METHOD AND CLOUD SECURITY FRAMEWORK FOR IMPLEMENTING TENANT LICENSE VERIFICATION

(71) Applicant: Boguslaw Ludwik Plewnia, Mission Viejo, CA (US)

(72) Inventor: Boguslaw Ludwik Plewnia, Mission Viejo, CA (US)

(73) Assignee: Sharp Laboratories of America, Inc., Camas, WA (US)

(*) Notice: Subject to any disclaimer, the term of this patent is extended or adjusted under 35 U.S.C. 154(b) by 80 days.

(21) Appl. No.: 13/671,820

(22) Filed: Nov. 8, 2012

(65) Prior Publication Data

US 2014/0130142 A1 May 8, 2014

(51) Int. Cl.
*H04L 29/06* (2006.01)
(52) U.S. Cl.
USPC ............................................................ 725/5
(58) Field of Classification Search
USPC ................................................. 705/59; 726/5
See application file for complete search history.

(56) References Cited

U.S. PATENT DOCUMENTS

| | | | | |
|---|---|---|---|---|
| 6,799,271 | B2* | 9/2004 | Kugai | 713/168 |
| 7,412,598 | B1* | 8/2008 | Gleichauf | 713/155 |
| 7,647,407 | B2 | 1/2010 | Omshehe et al. | |
| 8,015,299 | B2 | 9/2011 | Omshehe et al. | |
| 8,170,528 | B2 | 5/2012 | Montz et al. | |
| 8,336,089 | B1* | 12/2012 | Ahmed et al. | 726/7 |
| 8,386,623 | B2* | 2/2013 | Thomas | 709/229 |
| 8,607,054 | B2* | 12/2013 | Ramarathinam et al. | 713/172 |
| 2002/0069172 | A1 | 6/2002 | Omshehe et al. | |
| 2009/0030906 | A1 | 1/2009 | Doshi et al. | |
| 2011/0106875 | A1* | 5/2011 | Koenig | 709/203 |
| 2011/0131134 | A1 | 6/2011 | Ferris et al. | |
| 2011/0131315 | A1 | 6/2011 | Ferris et al. | |
| 2011/0145392 | A1 | 6/2011 | Dawson et al. | |
| 2011/0225417 | A1 | 9/2011 | Maharajh et al. | |
| 2011/0251937 | A1 | 10/2011 | Falk et al. | |
| 2011/0283224 | A1 | 11/2011 | Ramsey et al. | |
| 2011/0320955 | A1 | 12/2011 | O'Connor | |
| 2012/0260341 | A1 | 10/2012 | Chan et al. | |

FOREIGN PATENT DOCUMENTS

WO WO2006029054 3/2006

* cited by examiner

*Primary Examiner* — Ali Abyaneh
(74) *Attorney, Agent, or Firm* — Scot A. Reader

(57) ABSTRACT

A method and cloud security framework for implementing tenant license verification. The method and framework conduct tenant license verification transparently to cloud resources and users who request them. An exemplary method comprises receiving by the framework from a client device a request for access to a cloud resource and user information; authenticating by the framework a user of the device using the information; obtaining by the framework a security context for the user including a tenant identifier identifying a multi-user enterprise to which the user belongs using the information; transmitting by the framework to an outside entity over a web services interface a tenant license verification request including the identifier; receiving by the framework from the entity a verification that a tenant license associated with the identifier is in good standing; and granting by the framework to the device access to the resource.

18 Claims, 3 Drawing Sheets

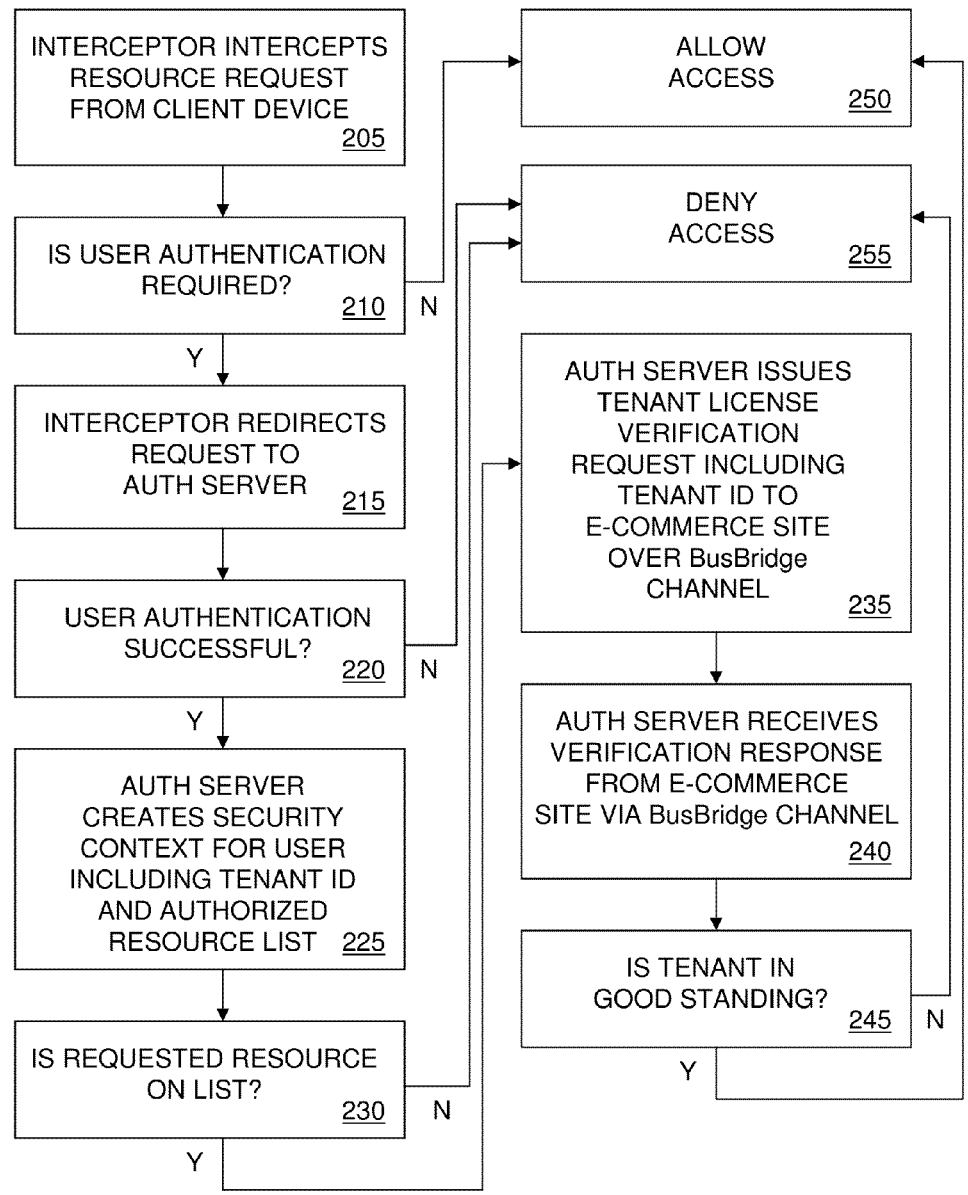

Fig. 3

```
using System;
Using System.ServiceModel;

Namespace Sharp.Cloud.IBusBridge
{
    // The ISecurityBridge contract definition ….
    [ServiceContract(Name = "SecurityService",
        Namespace = "urn:schemas-sc-jp:cloud:BusBridgeService-1-0"
    public interface ISecurity Bridge
    {
        [OperationContract]
        IResults AuthorizeAccount(IContext ctx);
        [OperationContract]
        IAccount GetAccountInfo(IContext ctx);
        [OperationContract]
    }
}
```

Fig. 4

```
// Service Class which implements the service contract.
public class = SecurityBridge: ISecurityBridge
{
    public IResults AuthorizeAccount(Icontext ctx)
    {
        // Forward the request down to the backend service
        return( backendProxy.AuthorizeAccount(ctx) );
    } public IAccount GetAccountInfo(IContext ctx)
    {
        // Forward the request down to the backend service
        return( backendProxy.GetAccountInfo(ctx) );
    }
}
```

METHOD AND CLOUD SECURITY FRAMEWORK FOR IMPLEMENTING TENANT LICENSE VERIFICATION

BACKGROUND OF THE INVENTION

The present invention relates to security in computer networks and, more particularly, controlling access to resources in a cloud computing environment.

In cloud computing, Internet users access shared resources hosted in a cloud computing environment. The shared resources may include applications, folders and files, by way of example. By default, the shared resources can be accessed by any Internet user who knows the Uniform Resource Locator (URL) of the resources.

Some cloud owners limit access to the shared resources in their cloud computing environment to users who belong to "tenants" of their environment. These tenants are multi-user enterprises that have entered with the cloud owner and are compliant with a tenant license. A tenant license is a contract between the cloud owner and a multi-user enterprise containing legal provisions, such as payment terms and cloud usage terms, that the enterprise and its users must follow as a condition for accessing cloud resources.

When a tenant fails to adhere to the terms of its tenant license, the cloud owner may revoke access to cloud resources by the tenant's users permanently or at least until adherence is reestablished. Access to cloud resources may be revoked by a cloud security framework deployed in the cloud computing environment that verifies, for each request for access to a cloud resource, that the user requesting access belongs to a tenant having a license that is in good standing.

Unfortunately, conventional tenant license verification schemes for cloud computing environments are suboptimal. Some schemes require that each cloud resource have code dedicated to the verification function enabling the resource to interoperate with the cloud security framework. Some schemes require that each user seeking access to a cloud resource submit, in addition to a user credential, information identifying the tenant to which the user belongs. Additionally, some schemes do not allow the rules and policies governing tenant license verification to be adapted without reconfiguring the framework.

SUMMARY OF THE INVENTION

The present invention provides a method and cloud security framework for implementing tenant license verification. The method and framework conduct tenant license verification transparently to cloud resources and users who request them. As such, the method and framework eliminate the requirement that each cloud resource have code dedicated to the verification function and the requirement that each user requesting access to a cloud resource submit information identifying the tenant to which the user belongs. The method and framework are also allow the rules and policies governing tenant license verification to be adapted without reconfiguring the framework.

In one aspect of the invention, a cloud security framework comprises an authentication server deployed in a cloud computing environment configured to receive from a client device a request for access to a cloud resource and user information, and to authenticate a user of the client device and obtain a security context for the user including a tenant identifier identifying a multi-user enterprise to which the user belongs using the user information; and a bridge server deployed in the environment operatively coupled with the authentication server and configured to transmit to an entity outside the environment over a web services interface a tenant license verification request including the tenant identifier and in response to the tenant license verification request receive from the outside entity verification that a tenant license associated with the tenant identifier is in good standing, wherein in response to the verification the authentication server grants the client device access to the cloud resource.

In some embodiments, the framework further comprises an interceptor deployed in the environment operatively coupled with the authentication server and configured to intercept the access request from the client device, determine whether authentication of the user is required and redirect the access request to the authentication server in response to determining that authentication of the user is required.

In some embodiments, the security context further includes a list of cloud resources for which the user is authorized and the authentication server is configured to transmit the tenant license verification request in response to verifying that the cloud resource is on the list.

In some embodiments, the verification manifests legal compliance with the tenant license by the multi-user enterprise.

In some embodiments, the outside entity is an e-commerce management site.

In some embodiments, the cloud resource is a software application.

In some embodiments, the tenant license verification request is a Simple Object Access Protocol (SOAP) request.

In some embodiments, the tenant license verification request is a Representational State Transfer (REST) request.

In some embodiments, the authentication server is a Security Token Service (STS) compliant server.

In another aspect of the invention, a tenant license verification method for a cloud computing environment comprises the steps of receiving by a cloud security framework deployed in the environment a request from a client device to access a cloud resource and user information; authenticating by the framework a user of the client device using the user information; obtaining by the framework a security context for the user including a tenant identifier identifying a multi-user enterprise to which the user belongs using the user information; transmitting by the framework to an entity outside the environment over a web services interface a tenant license verification request including the tenant identifier; receiving by the framework from the outside entity in response to the tenant license verification request a verification that a tenant license associated with the tenant identifier is in good standing; and granting by the framework to the client device access to the cloud resource.

These and other aspects of the invention will be better understood by reference to the following detailed description taken in conjunction with the drawings that are briefly described below. Of course, the invention is defined by the appended claims.

BRIEF DESCRIPTION OF THE DRAWINGS

FIG. 2 shows a tenant license verification method for the cloud computing environment of FIG. 1.

FIG. 3 shows a snippet of an exemplary definition of the ISecurityBridge interface used for tenant license verification requests.

FIG. 4 shows a snippet of an exemplary implementation of the ISecurityBridge interface used for tenant license verification requests.

DETAILED DESCRIPTION OF A PREFERRED EMBODIMENT

Figure 1:
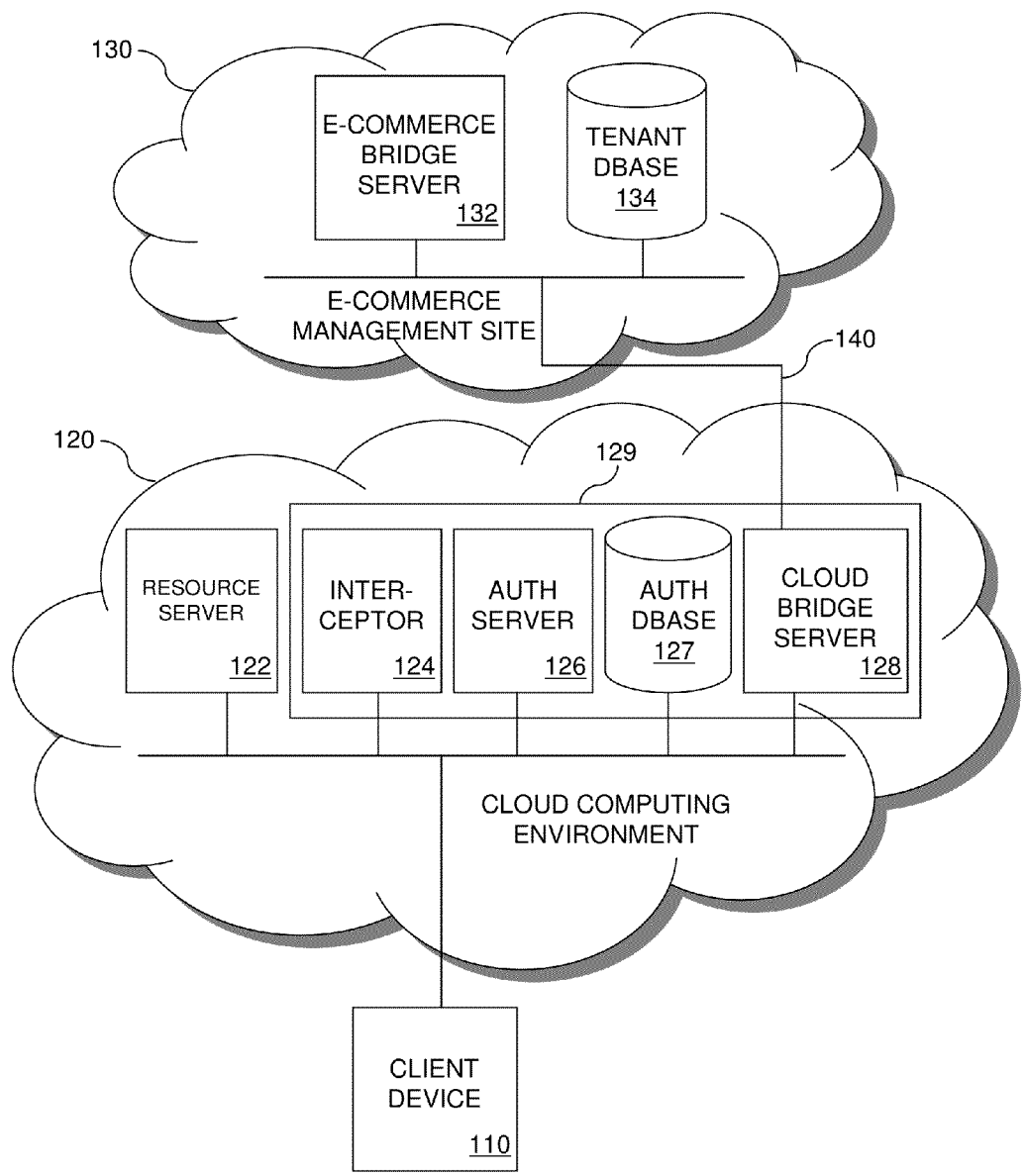
FIG. 1 shows a communication network including a cloud computing environment.

FIG. 1 shows a communication network that includes a cloud computing environment 120. Environment 120 includes a resource server 122 that hosts shared cloud resources, such as software applications, folders and files. Environment 120 also includes a cloud security framework 129 that controls access to cloud resources. Access controls provided by framework 129 include conditioning access to protected cloud resources on user authentication and tenant license verification. A tenant license is a contract entered by and between the owner of environment 120 and a multi-user enterprise (hereinafter "tenant") containing legal provisions, including financial obligations such as payment terms and business obligations such as cloud usage terms, that the tenant has agreed to meet in exchange for the owner's agreement to allow the tenant's users to access the cloud resources. A tenant license may take the form of a subscription agreement, by way of example. Tenant license verification verifies that users of client devices requesting access to protected cloud resources belong to a tenant having a tenant license in good standing before granting the requested access.

Framework 129 includes an interceptor 124, an authentication server 126, an authentication database 127 and a cloud bridge server 128 that interoperate to perform user authentication and communicate with a remote e-commerce management site 130 over a web services interface to achieve tenant license verification. Framework 129 achieves tenant license verification in a manner transparent to both client device 110 and the cloud resources. Elements of the framework 129 that transact with one another mutually authenticate to ensure they are transacting with authorized elements. In some embodiments, each element of framework 129 is a distinct network node. In other embodiments, multiple elements of framework 129 reside on a single network node.

Client device 110 is a computing device remote from environment 120. Client device 110 is manned by a user who belongs to a tenant. The user may be, for example, an employee of a company that has entered a subscription agreement with the owner of environment 120. Client device 110 has a user interface, a network interface and a web browser. Client device 110 may be, for example, a desktop computer, notebook computer, tablet computer or smart phone. Client device 110 issues a request to access a cloud resource when the user points the web browser to a URL of the cloud resource.

Interceptor 124 is a computing device within framework 129. Interceptor 124 monitors inbound requests to access cloud resources, determines authentication requirements for users of client devices that have issued the requests and forces authentication of users who require authentication. In some embodiments, interceptor 124 forces authentication if a user is requesting access to a protected cloud resource and has not previously been authenticated to the resource. In other embodiments, interceptor 124 forces authentication each time a user requests access to a protected cloud resource. Interceptor 124 considers a cloud resource protected if the resource has been configured to require user authentication as a condition for accessing the resource and to trust framework 129.

Authentication server 126 is a computing device within framework 129. Authentication server 126 determines whether users of client devices that interceptor 124 has determined require authentication are authentic. Authentication server 126 also determines whether authenticated users are authorized to access the particular cloud resources requested by such users. Authentication server 126 queries authentication database 127 for user account data and applies the user account data in making these determinations. Authentication server 126 also verifies that tenant licenses of tenants to which authenticated users belong are in good standing. Authentication server 126 invokes web services exposed on cloud bridge server 128 and e-commerce bridge server 132 in tenant license verification. These web services analyze whether tenant licenses are in good standing and return results of the analysis to authentication server 126. In some embodiments, authentication server 126 is an enhanced STS server.

Authentication database 127 is a storage device within framework 129. Authentication database 127 retains user accounts. Each user account includes a name of a user (e.g., username), a credential for the user (e.g., password or digital certificate) and a security context that provides claims about the user. The security context includes list of cloud resources for which the user is authorized and a tenant identifier (hereinafter "tenant ID") of a tenant to which the user belongs. The tenant ID is an object managed by framework 129 representing a multi-user enterprise that has a contractual right under a tenant license to access all or a specified subset of cloud resources, subject to compliance with contractual obligations assumed by the enterprise under the tenant license.

Cloud bridge server 128 is a computing device within framework 129 that exposes a business bridge (hereinafter "BusBridge") web service. The BusBridge web service is a SOAP or REST service that provides technical means to securely access via a BusBridge channel 140 a business bridge backend (hereinafter "BusBridgeBackEnd") web service exposed on e-commerce bridge server 132 that analyzes whether tenant licenses are in good standing. The BusBridge service does not itself perform the "good standing" analysis but rather delegates this analysis to the BusBridgeBackEnd web service. The BusBridgeBackEnd service accepts calls only from valid elements of framework 129. Other calls are ignored. Authentication server 126 invokes the BusBridge service.

E-commerce bridge server 132 is a server within e-commerce management site 130 that exposes the BusBridgeBackEnd web service. The BusBridgeBackEnd web service is a SOAP or REST service invoked by the BusBridge web service. The BusBridgeBackEnd service accepts calls only from valid BusBridge services. Other calls are ignored. The BusBridgeBackEnd service determines whether tenant licenses of tenants to which authenticated users of client devices requesting access to cloud services belong are in good standing. The BusBridgeBackEnd service queries tenant database 134 for tenant data and analyzes the tenant data in making these determinations. The BusBridgeBackEnd service considers a tenant license to be in good standing if the tenant is presently in compliance with legal provisions of the tenant license, including financial obligations such as payment terms and business obligations such as cloud usage terms, that the tenant has agreed to in exchange for the owner's agreement to allow the tenant's users access to the cloud resources.

Tenant database 134 is a storage device within e-commerce management site 130 that retains tenant accounts. Each tenant account has a tenant ID of a multi-user enterprise that has a tenant license with the owner of environment 120 and a compliance context that provides information evidencing the present compliance status of the tenant under the tenant license, that is, an indication of whether or not the tenant is in good standing. In some embodiments, the compliance context is a binary status indicator that directly informs whether or not the tenant is currently compliant. In other embodiments, the compliance context includes compliance details (e.g., financial, business and legal records) that BusBridgeBackEnd service analyzes under an operative set of compliance rules and policies to determine whether or not the tenant is presently in good standing. The rules and policies applied by BusBridgeBackEnd service and the contents of tenant database 134 may be updated automatically and/or by an administrator of e-commerce management site 130 as circumstances warrant. Such updates are transparent to the cloud resources, client devices and users of client devices and do not require reconfiguration of framework 129.

FIG. 2 illustrates a tenant license verification method for environment 120. At the outset, client device 110, at the behest of a user, issues a request to access a cloud resource hosted on resource server 122. Interceptor 124 intercepts the request (205) and determines whether the user requires authentication (210). If the user does not require authentication, access to the cloud resource is allowed (250). However, if the user requires authentication, interceptor 124 redirects the request to authentication server 126 (215). Authentication server 126 receives the redirected request and attempts to authenticate the user. In particular, authentication server 126 issues a login prompt to client device 110 requesting the user to provide login information including a user credential, such as a username and password. The user responds to the login prompt and client device 110 issues a login response to authentication server 126 including the requested login information. At that point, authentication server 126 queries authentication database 127 and attempts to locate the user's account and validate the user credential. If authentication server 126 is unable to locate the user's account or validate the user's credential, authentication server 126 denies access to the cloud resource (255). However, if authentication server 126 is able to locate the user's account and validate the user's credential, the user is considered authenticated (220). Authentication server 126 then creates a security context for the user from information in the user's account (225). The security context includes a tenant ID of a tenant to which the user belongs and a list of cloud resources for which the user is authorized. Authentication server 126 then determines whether the cloud resource that is the subject of the access request is on the list (230). If the requested cloud resource is not on the list, authentication server 126 denies access to the resource (255). However, if the requested cloud resource is on the list, authentication server 126 issues a tenant license verification request including the tenant ID to e-commerce management site 130 over BusBridge channel 140 (235).

The tenant license verification request issued by authentication server 126 will now be described in greater detail. The BusBridge web service on cloud bridge server 128 exposes a set of web services interfaces dedicated to a particular business domain, in this case cloud computing environment 120, whose commercial aspects are managed by e-commerce site 130. The exposed interfaces include a ISecurityBridge interface for cloud security-related tasks, a IPayBridge interface for credit card transactions and an IAccBridge interface for account management tasks. To issue a tenant license verification request, authentication server 126 calls one or more SOAP or REST methods on the ISecurityBridge interface. A snippet of an exemplary ISecurityBridge interface definition available on the BusBridge service is shown in FIG. 3. A snippet of an exemplary implementation of the ISecurity-Bridge interface is shown in FIG. 4. The snippets are presented in Windows .NET C# language. The request may take the form, for example:

IResults ISecurityBridge::AuthorizeAccount(IContext)

In the illustrated examples, the IContext data type is a descriptor of the call security context includes, without limitation, the tenant ID, an identifier of the cloud resource, an identifier of the client device and login information. The IResults data type is a descriptor that contains information resulting from processing of the request, such as a completion code, a message and an extra set of claims. The (Account data type is a descriptor of the tenant account. The ISecurityBridge interface transmits the request to the BusBridgeBackEnd web service on e-commerce bridge interface 132 over BusBridge channel 140. The BusBridgeBackEnd service uses the tenant ID to retrieve associated tenant data from tenant database 134, apply rules and policies to the tenant data to determine whether or not the tenant is presently in good standing under its tenant license and generate and return to authentication server 126 on the ISecurityBridge interface over BusBridge channel 140 a tenant license verification response indicating whether or not the tenant is in good standing.

When authentication server 126 receives the tenant license verification response (240), authentication server 126 determines from the response whether or not the tenant is in good standing (245). If the tenant is in good standing, access to the requested cloud resource is allowed (250). If the tenant is not in good standing, access to the requested cloud resource is denied (255).

The elements of the communication network described herein may perform their respective roles in software executable by a processor, in custom logic, or in a combination thereof. Moreover the elements perform their respective roles in accordance with the following industry-accepted security specifications, where applicable: Web Services Trust (WS-Trust), Web Services Federation (WS-Federation), Web Services Security (WS-Security), Security Assertion Markup Language (SAML), STS, Claims-Based Security Model and Claims-Based Identity Model.

It will be appreciated by those of ordinary skill in the art that the invention can be embodied in other specific forms without departing from the spirit or essential character hereof. For example, while the tenant license verification requests and responses described herein have been indicated to be SOAP or REST requests and responses, a request/response protocol other than SOAP or REST may be used. The present description is therefore considered in all respects to be illustrative and not restrictive. The scope of the invention is indicated by the appended claims, and all changes that come with in the meaning and range of equivalents thereof are intended to be embraced therein.

What is claimed is:

1. A cloud security framework, comprising:

an authentication server computing device shared by a multiple of cloud resources in a cloud computing environment configured to receive from a client device a request for access to a particular cloud resource and user information, and to authenticate a user of the client device and obtain a security context for the user including a tenant identifier identifying a multi-user enterprise to which the user belongs using the user information; and a bridge server computing device shared by the multiple of cloud resources in the environment operatively coupled with the authentication server computing device and configured to transmit to a backend entity outside the environment shared by the multiple of cloud resources over a web services interface a tenant license verification request including the tenant identifier and in response to the tenant license verification request receive from the backend entity legal compliance status information indicating whether the enterprise is presently compliant with a tenant license agreement governing access to the cloud resources by users belonging to the enterprise, wherein in response to an indication of present compliance with the tenant license agreement the authentication server computing device grants the client device access to the cloud resource, wherein tenant license verification is achieved transparent to the client device and the cloud resource.

2. The framework of claim 1, further comprising an interceptor computing device deployed in the environment operatively coupled with the authentication server computing device and configured to intercept the access request from the client device, determine whether authentication of the user is required and redirect the access request to the authentication server computing device in response to determining that authentication of the user is required.

3. The framework of claim 1, wherein the security context further includes a list of cloud resources for which the user is authorized and the authentication server computing device is configured to transmit the tenant license verification request in response to verifying that the cloud resource is on the list.

4. The framework of claim 1, wherein the legal compliance status information indicates present compliance of the enterprise with financial and business obligations under the tenant license agreement.

5. The framework of claim 1, wherein the backend entity is an e-commerce management site.

6. The framework of claim 1, wherein the cloud resource is a software application.

7. The framework of claim 1, wherein the tenant license verification request is a Simple Object Access Protocol (SOAP) request.

8. The framework of claim 1, wherein the tenant license verification request is a Representational State Transfer (REST) request.

9. The framework of claim 1, wherein the authentication server computing device comprises a Security Token Service (STS) compliant server.

10. A tenant license verification method for a cloud computing environment, comprising the steps of:
   receiving by a cloud security framework shared by a multiple of cloud resources in the environment a request from a client device to access a particular cloud resource and user information;
   authenticating by the framework a user of the client device using the user information;
   obtaining by the framework a security context for the user including a tenant identifier identifying a multi-user enterprise to which the user belongs using the user information;
   transmitting by the framework to a backend entity outside the environment shared by the multiple of cloud resources over a web services interface a tenant license verification request including the tenant identifier;
   receiving by the framework from the backend entity in response to the tenant license verification request legal compliance status information indicating whether the enterprise is presently compliant with a tenant license agreement governing access to the cloud resources by users belonging to the enterprise; and
   granting by the framework to the client device access to the cloud resource in response to an indication of present compliance with the tenant license agreement, wherein tenant license verification is achieved transparent to the client device and the cloud resource.

11. The method of claim 10, further comprising the step of determining by the framework whether authentication of the user is required.

12. The method claim 10, wherein the security context further includes a list of cloud resources for which the user is authorized, further comprising the step of verifying by the framework that the cloud resource is on the list.

13. The method of claim 10, wherein the legal compliance status information indicates present compliance of the enterprise with financial and business obligations under the tenant license agreement.

14. The method of claim 10, wherein the backend entity is an e-commerce management site.

15. The method of claim 10, wherein the cloud resource is a software application.

16. The method of claim 10, wherein the tenant license verification request is a Simple Object Access Protocol (SOAP) request.

17. The method of claim 10, wherein the tenant license verification request is a Representational State Transfer (REST) request.

18. The method of claim 10, wherein the framework comprises a Security Token Service (STS) compliant server.

* * * * *